United States Patent
Yasui et al.

(10) Patent No.: US 11,381,698 B2
(45) Date of Patent: Jul. 5, 2022

(54) IMAGE FORMING APPARATUS AND METHOD FOR CONTROLLING IMAGE FORMING APPARATUS

(71) Applicant: TOSHIBA TEC KABUSHIKI KAISHA, Tokyo (JP)

(72) Inventors: Kazumasa Yasui, Arakawa Tokyo (JP); Masaya Arakawa, Hiratsuka Kanagawa (JP); Ken Iguchi, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/337,484

(22) Filed: Jun. 3, 2021

(65) Prior Publication Data
US 2022/0094804 A1    Mar. 24, 2022

(30) Foreign Application Priority Data
Sep. 23, 2020  (JP) .............................. JP2020-159118

(51) Int. Cl.
*G06F 3/12* (2006.01)
*H04N 1/00* (2006.01)
*B41J 29/393* (2006.01)

(52) U.S. Cl.
CPC ........ *H04N 1/00689* (2013.01); *B41J 29/393* (2013.01); *H04N 1/00697* (2013.01); *H04N 1/00734* (2013.01); *H04N 1/00771* (2013.01)

(58) Field of Classification Search
CPC ........... H04N 1/00689; H04N 1/00692; H04N 1/00697; H04N 1/00734; H04N 1/00771; B41J 29/393
See application file for complete search history.

(56) References Cited

U.S. PATENT DOCUMENTS

| | | | |
|---|---|---|---|
| 2015/0346668 A1* | 12/2015 | Miyamoto | B65H 43/06 399/364 |
| 2016/0363901 A1* | 12/2016 | Arakawa | G03G 15/6576 |
| 2019/0332337 A1* | 10/2019 | Matsumae | G06F 3/1207 |

FOREIGN PATENT DOCUMENTS

JP   2008-058726   3/2008

* cited by examiner

*Primary Examiner* — Moustapha Diaby
(74) *Attorney, Agent, or Firm* — Amin, Turocy & Watson LLP (57) ABSTRACT

An image forming apparatus includes an exit tray, a printing unit, an output unit, and a control unit. A printing medium after printing is discharged to the exit tray. The printing unit performs printing of an image on the printing medium, and discharges the printing medium after printing to the exit tray. The output unit outputs information. The control unit causes the printing unit to stop the printing of the image on the printing medium, and causes the output unit to output alert information on discharge of the printing medium to the exit tray, if the number of printing media on the exit tray is equal to or greater than a predetermined first threshold value. The control unit causes the printing unit to stop the printing of the image on the printing medium, and causes the output unit to output the alert information, if the number of printing media on the exit tray is equal to or greater than a second threshold value which is smaller than the first threshold value, and if a predetermined printing stop condition is satisfied.

20 Claims, 4 Drawing Sheets

IMAGE FORMING APPARATUS AND METHOD FOR CONTROLLING IMAGE FORMING APPARATUS

CROSS-REFERENCE TO RELATED APPLICATION

This application is based upon and claims the benefit of priority from. Japanese Patent Application No. 2020-159118, filed on Sep. 23, 2020, the entire contents of which are incorporated herein by reference.

FIELD

Embodiments described herein relate generally to an image forming apparatus and a method for controlling the image forming apparatus.

BACKGROUND

In a related art, known is an image forming apparatus that stops an image forming process if a printing medium discharged to an exit tray becomes full.

Meanwhile, the image forming apparatus stops the image forming process even if the remaining number of printing media stored in a paper feeding cassette becomes zero. Since the stop processes are determined independently, the image formation process may be stopped continuously in a short period of time depending on each timing.

DETAILED DESCRIPTION

One embodiment provides an image forming apparatus capable of improving convenience of a user, and a method for controlling the image forming apparatus.

In general, according to one embodiment, an image forming apparatus includes an exit tray, a printing unit, an output unit, and a control unit. A printing medium after printing is discharged to the exit tray. The printing unit performs printing of an image on the printing medium, and discharges the printing medium after printing to the exit tray. The output unit outputs information. The control unit causes the printing unit to stop the printing of the image on the printing medium, and causes the output unit to output alert information on discharge of the printing medium to the exit tray, if the number of printing media on the exit tray is equal to or greater than a predetermined first threshold value. The control unit causes the printing unit to stop the printing of the image on the printing medium, and causes the output unit to output the alert information, if the number of printing media on the exit tray is equal to or greater than a second threshold value which is smaller than the first threshold value, and if a predetermined printing stop condition is satisfied.

Hereinafter, an image forming apparatus according to an embodiment will be described with reference to the drawings. In each drawing, the same configuration will be denoted by the same reference sign. Hereinafter, as an example of the image forming apparatus according to the embodiment, an image forming apparatus 100 will be described as an example.

(Details of the Image Forming Apparatus)

Hereinafter, details of the image forming apparatus 100 will be described with reference to FIG. 1.

Figure 1:
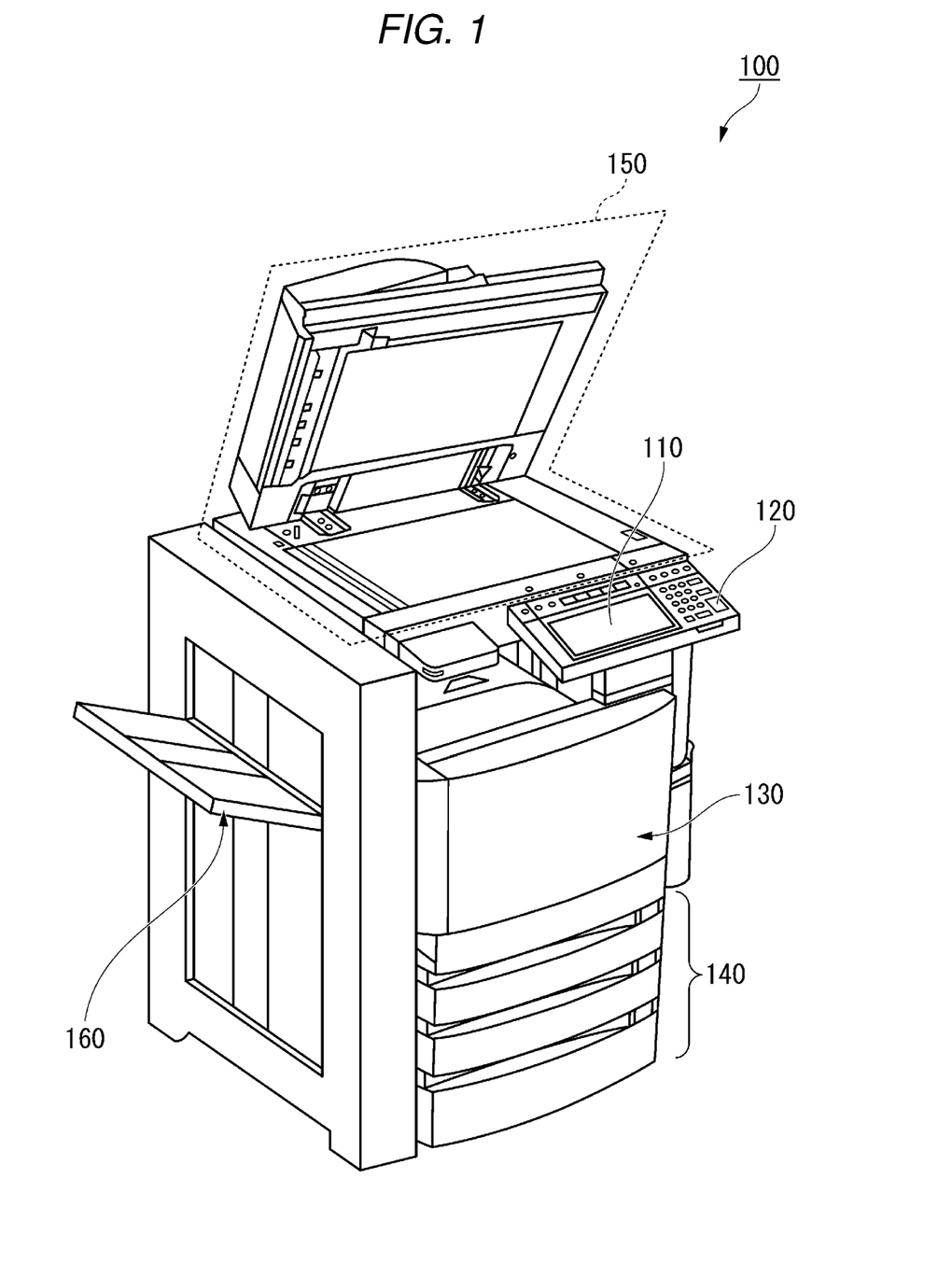
FIG. 1 is an external view illustrating an overall configuration example of an image forming apparatus 100 according to an embodiment.

FIG. 1 is an external view illustrating an overall configuration example of the image forming apparatus 100 according to the embodiment. The image forming apparatus 100 forms an image on a printing medium by using a developer such as toner or the like.

The printing medium is, for example, paper, label paper, or the like. The printing medium may be any medium as long as the image forming apparatus 100 can form an image on a surface thereof.

The image forming apparatus 100 is, for example, a multifunction device. The image forming apparatus 100 may be other printers other than the multifunction device.

The image forming apparatus 100 includes a display 110, a control panel 120, a printer unit 130, a printing medium storage unit 140, an image reading unit 150, and an exit tray 160. Here, as an example, a case in which the image forming apparatus 100 does not include a sensor, a switch, or the like for detecting that the number of printing media discharged to the exit tray 160 reaches a predetermined number, will be described below. Hereinafter, as an example, a case in which the printer unit 130 is an apparatus that fixes a toner image will be described. The image forming apparatus 100 may be configured to include the sensor, the switch, or the like for detecting that the number of printing media discharged to the exit tray 160 reaches the predetermined number. The printer unit 130 of the image forming apparatus 100 may be an apparatus of another type such as an apparatus of an inkjet type or the like.

The display 110 is an image display apparatus such as a liquid crystal display, an organic electro luminescence (EL) display, or the like. The display 110 displays various information on the image forming apparatus 100. In other words, the display 110 outputs various information on the image forming apparatus 100. The display 110 is an example of an output unit.

The control panel 120 includes a plurality of buttons. The control panel 120 receives a user operation. The control panel 120 outputs a signal corresponding to the operation performed by the user to a control unit of the image forming apparatus 100. The display 110 and the control panel 120 may be configured as an integrated touch panel.

The printer unit 130 forms an image on the printing medium based upon image information generated by the image reading unit 150 or image information received via a communication path. The printer unit 130 forms the image by, for example, a following process. An image forming unit of the printer unit 130 forms an electrostatic latent image on a photosensitive drum based upon the image information. The image forming unit of the printer unit 130 forms a visible image by causing the developer to adhere to the electrostatic latent image. A specific example of the developer includes toner. A transfer unit of the printer unit 130 transfers the visible image to the printing medium. A fixing unit of the printer unit 130 fixes the visible image on the printing medium by heating and pressurizing the printing medium. The printing medium on which the image is formed may be a printing medium stored in the printing medium storage unit 140, or may be a manually-fed printing medium. The printer unit 130 is an example of a printing unit.

The printing medium storage unit 140 stores the printing medium to be used for image formation in the printer unit 130. The printing medium storage unit 140 includes, for example, a paper feeding roller, a paper feeding cassette, or the like.

The image reading unit 150 reads image information of a target to be read based upon brightness and darkness of light. The image reading unit 150 records the read image information thereof. The recorded image information may be transmitted to another information processor via a network. The recorded image information may be image-formed on the printing medium by the printer unit 130.

The exit tray 160 is a tray to which the printing medium, on which the image is formed by the printer unit 130, is discharged from the printer unit 130.

(A Functional Configuration of the Image Forming Apparatus)

Hereinafter, a functional configuration of the image forming apparatus 100 will be described with reference to FIG. 2. Hereinafter, for the convenience of description, forming an image on a printing medium will be described as printing of an image on a printing medium.

Figure 2:
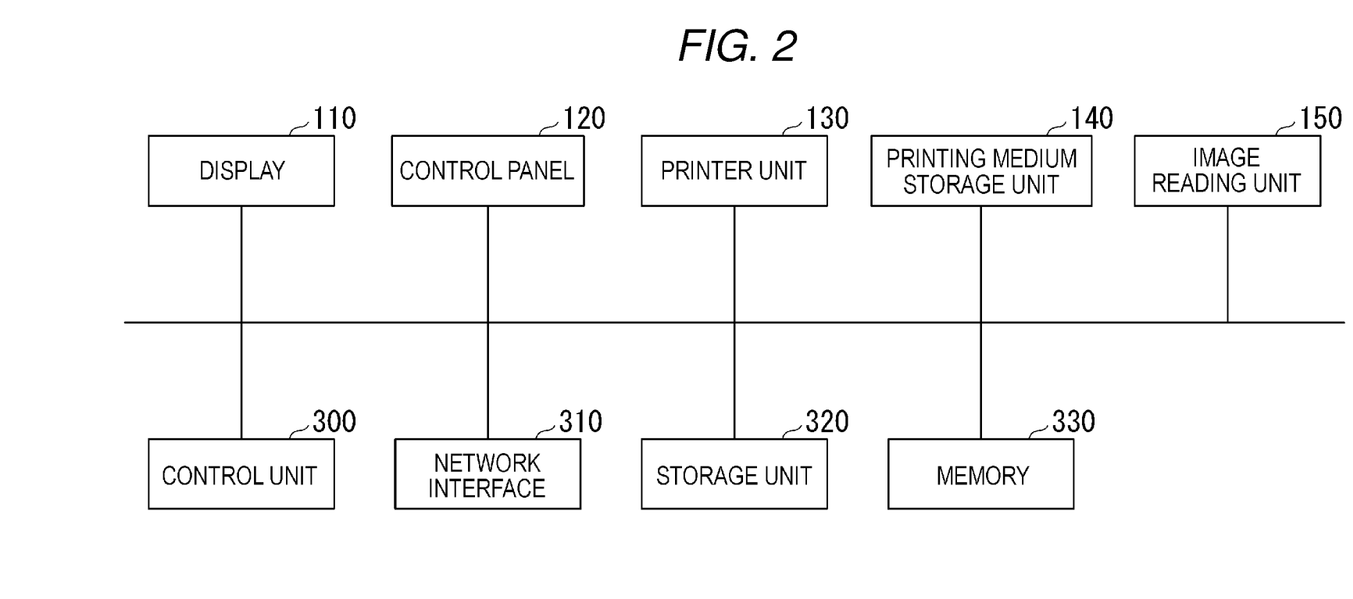
FIG. 2 is a diagram illustrating a functional configuration example of the image forming apparatus 100.

FIG. 2 is a diagram illustrating a functional configuration example of the image forming apparatus 100.

The image forming apparatus 100 includes the display 110, the control panel 120, the printer unit 130, the printing medium storage unit 140, and the image reading unit 150. The image forming apparatus 100 also includes a control unit 300, a network interface 310, a storage unit 320, and a memory 330. The respective functional units provided in the image forming apparatus 100 are communicably connected to each other via a system bus. Since the exit tray 160 is not connected to the system bus, the exit tray 160 is not illustrated in FIG. 2.

Since the display 110, the control panel 120, the printer unit 130, the printing medium storage unit 140, and the image reading unit 150 are described in the same manner as described above, the description thereof will be omitted. Hereinafter, the control unit 300, the network interface 310, the storage unit 320, and the memory 330 will be described.

The control unit 300 is an example of the control unit of the image forming apparatus 100. The control unit 300 includes a central processing unit (CPU) of the image forming apparatus 100. The control unit 300 controls an operation of each functional unit of the image forming apparatus 100. The control unit 300 executes various processes by executing a program. The control unit 300 acquires an instruction inputted by a user from the control panel 120. That is, the control unit 300 receives the operation from the user by the control panel 120. The control unit 300 executes a control process based upon the acquired instruction.

The control unit 300 counts the number of sheets of the printing medium after printing discharged to the exit tray 160 as the number of discharge counts.

If the number of discharge counts is equal to or greater than a predetermined first threshold value, the control unit 300 causes the printer unit 130 to stop the printing of the image on the printing medium, and notifies alert information on the discharge of the printing medium to the exit tray 160. Here, for example, the control unit 300 notifies the alert information by displaying the alert information on the display 110. The predetermined first threshold value is a value set in advance in the image forming apparatus 100. The first threshold value may be changeable by the user or may not be changeable by the user. If the first threshold value can be changed by the user, the control unit 300 sets the first threshold value according to the received operation. Hereinafter, as an example, a case in which the first threshold value is a maximum value for the number of discharge counts will be described. In other words, the maximum value is a value recommended by a manufacturer of the image forming apparatus 100 as the number of sheets serving as a reference that causes the user to remove the printing medium from the exit tray 160 on which the printing medium is placed. The first threshold value may be another predetermined value instead of the maximum value.

If the number of discharge counts is equal to or greater than a second threshold value, which is smaller than the first threshold value, and if a predetermined printing stop condition is satisfied, the control unit 300 causes the printer unit 130 to stop the printing of the image on the printing medium and to notify the alert information. Here, for example, the control unit 300 notifies the alert information by displaying the alert information on the display 110. The second threshold value may be any value as long as the second threshold value is a value which is equal to or greater than 1 and is smaller than the first threshold value. The second threshold value may be changeable by the user or may not be changeable by the user. If the second threshold value can be changed by the user, the control unit 300 sets the second threshold value according to the received operation. Hereinafter, as an example, a case in which the second threshold value is a value obtained by multiplying the first threshold value by a predetermined ratio will be described. The predetermined ratio is, for example, 96%. The predetermined ratio may be less than 96% or higher than 96%. Accordingly, the control unit 300 can prevent the printing from being repeatedly stopped in a short period of time. As a result, the control unit 300 can improve the convenience of the user. The second threshold value may be another value instead of the value obtained by multiplying the first threshold value by the predetermined ratio.

Data is transmitted and received between the network interface 310 and other apparatuses. The network interface 310 operates as an input interface and receives the data transmitted from other apparatuses. The network interface 310 operates as an output interface and transmits the data to other apparatuses.

The storage unit 320 is, for example, an auxiliary storage device such as a hard disk, a solid state drive (SSD), or the like. The storage unit 320 stores various types of information. For example, the storage unit 320 stores a program to be executed by the control unit 300. The program is, for example, firmware, an application, or the like. For example, the storage unit 320 stores information indicating the above-described first threshold value, information indicating the above-described second threshold value, or the like.

The memory 330 is, for example, a random access memory (RAM). The memory 330 temporarily stores information to be used by each functional unit provided in the image forming apparatus 100. The memory 330 may store image information read by the image reading unit 150, a program for operating each functional unit, or the like.

(A Process in which the Image Forming Apparatus Performs the Printing of the Image on the Printing Medium)

Hereinafter, a process in which the image forming apparatus 100 performs the printing of the image on the printing medium will be described with reference to FIG. 3.

Figure 3:
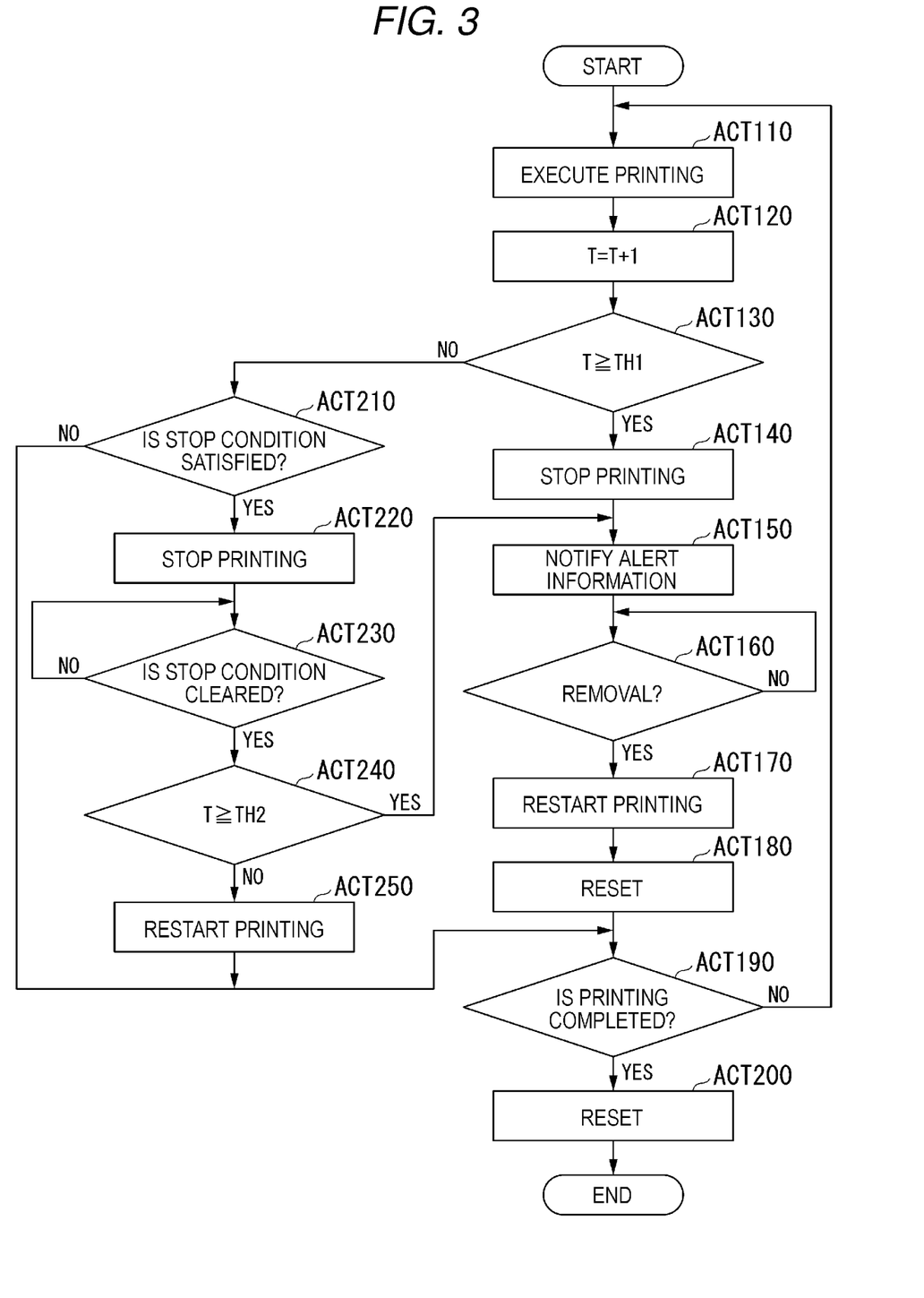
FIG. 3 is a diagram illustrating an example of a flow of a process in which the image forming apparatus 100 performs printing of an image on a printing medium.

FIG. 3 is a diagram illustrating an example of a flow of the process in which the image forming apparatus 100 performs the printing of the image on the printing medium. Hereinafter, as an example, a case in which the number of sheets stored in the printing medium storage unit 140 is 500 sheets will be described. Hereinafter, as an example, a case, in which the control unit 300 receives a printing start operation for causing the image forming apparatus 100 to start printing of an image on each of 1000 sheets of printing media at a timing before a process of ACT 110 illustrated in FIG. 3 is performed, will be described. The printing of the image on each of the 1000 sheets of printing media is an example of one job received by the image forming apparatus 100. Next, hereinafter, as an example, a case in which the image forming apparatus 100 does not receive a job other than the printing of the image on each of 1000 sheets of printing media, will be described. Hereinafter, as an example, a case in which the above-described first threshold value is set in advance as 250 sheets in the image forming apparatus 100, will be described. Here, in the example, the second threshold value is 240 sheets. Hereinafter, as an example, a case in which the above-described number of discharge counts is initialized to an initial value at a relevant timing, will be described. The initial value of the number of discharge counts is, for example, 0. In FIG. 3, the number of discharge counts is indicated by T. The printing start operation may be performed by a button provided in the control panel 120. If the control panel 120 is configured to be integrated with the display 110 as a touch panel, the printing start operation may be performed by a software key displayed on the display 110. The control unit 300 repeats the process of the flowchart illustrated in FIG. 3 every time printing starts according to the printing start operation received in advance, that is, every time a received job is executed.

The control unit 300 starts to convey one sheet of printing medium from the printing medium storage unit 140. Next, the control unit 300 executes the printing of the image on the printing medium starting to be conveyed (ACT 110).

Next, the control unit 300 counts the number of discharge counts and increments the number of discharge counts by 1 (ACT 120). Here, for example, if a predetermined sensor detects the printing medium, the control unit 300 counts the number of discharge counts. The predetermined sensor may be any sensor as long as the sensor can detect the printing medium passing through a conveyance path of the image forming apparatus 100 at the time of printing the image on the printing medium. The predetermined sensor may be, for example, a sensor provided near an exit from the printer unit 130 to the exit tray 160. The predetermined sensor may be, for example, a sensor provided near an exit of the fixing unit of the printer unit 130. The control unit 300 may be configured to count the number of discharge counts based upon a signal transmitted and received by software such as firmware or the like at the time of printing the image on the printing medium.

Next, the control unit 300 determines whether the number of discharge counts is equal to or greater than the first threshold value (ACT 130). In FIG. 3, the first threshold value is indicated by TH1. Here, in the example, since the first threshold value is 250 sheets, the first threshold value is described as TH1=250 sheets. That is, in the example, in ACT 130, the control unit 300 determines whether the number of discharge counts is equal to or greater than the maximum value for the number of discharge counts. In other words, in ACT 130, the control unit 300 determines whether the number of discharge counts is equal to or greater than the number of sheets serving as the reference that causes the user to remove the printing medium from the exit tray 160 on which the printing medium is placed.

If the control unit 300 determines that the number of discharge counts is equal to or greater than the first threshold value (ACT 130—YES), the control unit 300 causes the printer unit 130 to stop the printing of the image on the printing medium by the printer unit 130 (ACT 140).

Figure 4:
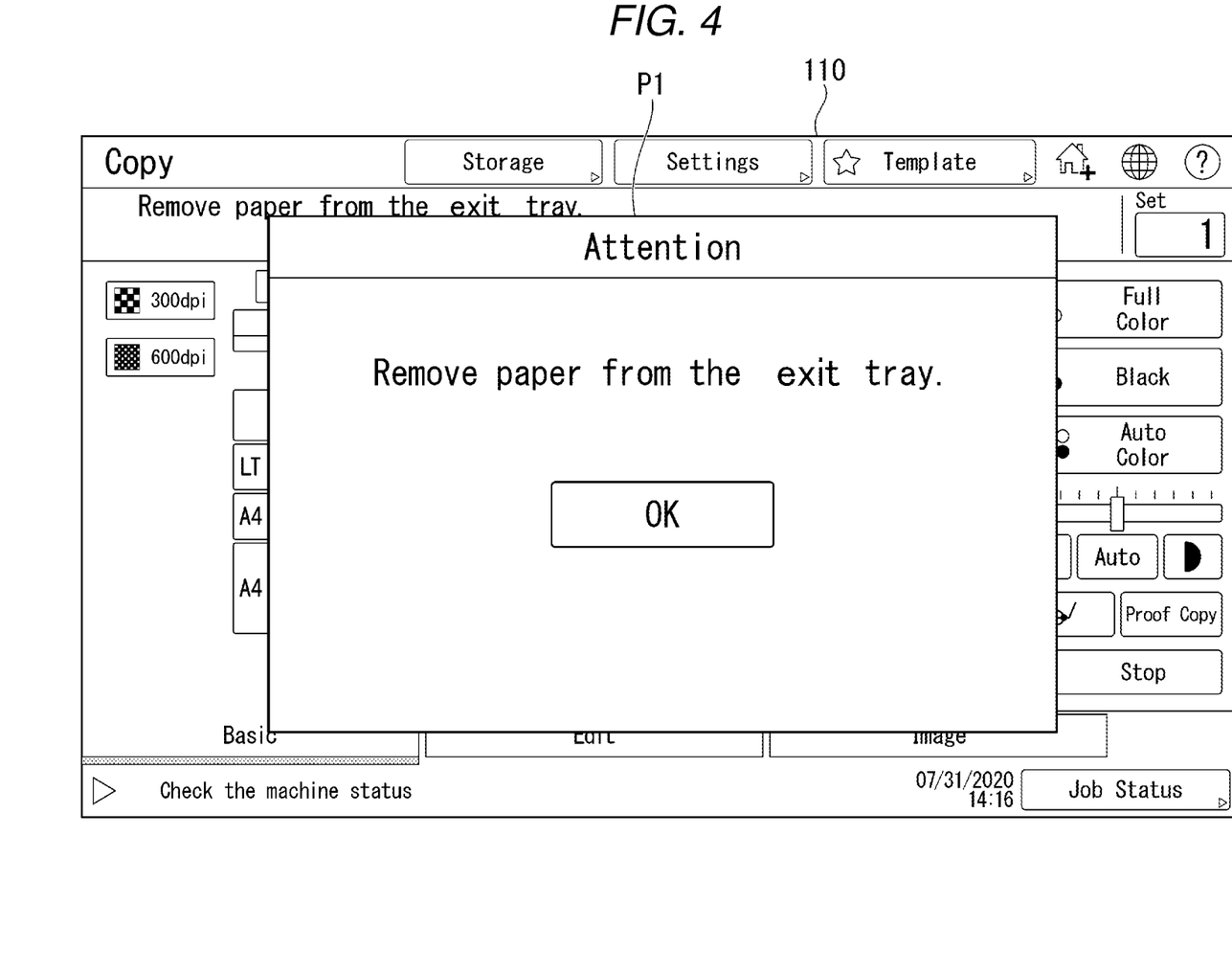
FIG. 4 is a diagram illustrating an example of an alert image.

Next, the control unit 300 notifies the above-described alert information (ACT 150). Here, the alert information will be described. As described above, the alert information is information on the discharge of the printing medium to the exit tray 160. For example, the alert information is an alert image including information that urges the user to remove the printing medium from the exit tray 160. Here, the control unit 300 generates the alert image and displays the generated alert image on the display 110, thereby notifying the alert information in ACT 150. FIG. 4 is a diagram illustrating an example of the alert image.

An image P1 illustrated in FIG. 4 is an example of the alert image. The image P1 includes, for example, information D1 and a button B1. The image P1 may be configured to include other information on the discharge of the printing medium to the exit tray 160 instead of either one or both of the information D1 and the button B1. The image P1 may be configured to include other information on the discharge of the printing medium to the exit tray 160 in addition to either one or both of the information D1 and the button B1.

The information D1 is an example of information that urges the user to remove the printing medium from the exit tray 160. In the image P1, the information D1 may be replaced with other information such as an error code or the like indicating that the printing medium cannot be discharged to the exit tray 160.

The button B1 is a graphical user interface (GUI) that receives an operation of notifying the control unit 300 that the removal of the printing medium from the exit tray 160 is completed. In the image P1, the button B1 may be replaced with another GUI that receives the operation.

The alert information may be notified by a lighting pattern from a light emitting diode (LED). Here, the image forming apparatus 100 includes the LED that lights up a light having the lighting pattern indicating the alert information. The alert information may be notified by voice guidance from a speaker. Here, the image forming apparatus 100 includes the speaker that emits a voice indicating the alert information. The alert information may be configured to be notified by other modes such as vibration or the like. Here, the image forming apparatus 100 includes a member capable of notifying the alert information according to the mode of the alert information. Each of the LED and the speaker is an example of the output unit.

The control unit 300 may be configured to perform the process of ACT 140 and the process of ACT 150 in reverse order, and may be configured to perform the process of ACT 140 and the process of ACT 150 in parallel.

Next, the control unit 300 waits until the removal of the printing medium from the exit tray 160 is completed (ACT 160). In FIG. 3, the process of ACT 160 is shown as "removal?". If the control unit 300 receives, for example, an operation of notifying the control unit 300 that the removal of the printing medium from the exit tray 160 is completed, the control unit 300 determines that the removal of the printing medium from the exit tray 160 is completed. When the alert information is the image P1 illustrated in FIG. 4, the control unit 300 receives the operation via the button B1. The control unit 300 may be configured to determine whether the removal of the printing medium from the exit tray 160 is completed based upon a signal to be outputted from a sensor for detecting that the printing medium is not placed on the exit tray 160.

If the control unit 300 determines that the removal of the printing medium from the exit tray 160 is completed (ACT 160—YES), the control unit 300 causes the printer unit 130 to restart the printing of the image on the printing medium (ACT 170).

Next, the control unit 300 initializes the number of discharge counts to the initial value (ACT 180). In FIG. 3, the process of ACT 180 is shown as "reset".

Next, the control unit 300 determines whether the printing of the image on each of the 1000 sheets of printing media started by receiving the printing start operation is completed (ACT 190).

If the control unit 300 determines that the printing of the image on each of the 1000 sheets of printing media is not completed (ACT 190—NO), the control unit 300 transitions to ACT 110 and executes the printing of the image on the next printing medium.

On the other hand, if the control unit 300 determines that the printing of the image on each of the 1000 sheets of printing media is completed (ACT 190—YES), the control unit 300 initializes the number of discharge counts to the initial value (ACT 200), and ends the process of the flowchart illustrated in FIG. 3. That is, if the control unit 300 determines that one received job is completed in ACT 190, the control unit 300 initializes the number of discharge counts to the initial value in ACT 200 and ends the process of the flowchart. In other words, the number of discharge counts is reset every time printing on one or a plurality of printing media forming one job is completed. In FIG. 3, the process of ACT 200 is shown as "reset".

On the other hand, if the control unit 300 determines that the number of discharge counts is less than the first threshold value (ACT 130—NO), the control unit 300 determines whether the predetermined printing stop condition is satisfied (ACT 210). Here, the predetermined printing stop condition is one or more conditions that cause the printer unit 130 to stop the printing of the image on the printing medium if the condition is satisfied. If at least one of the conditions is satisfied, the control unit 300 determines that the printing stop condition is satisfied. On the other hand, if any one of the conditions is not satisfied, the control unit 300 determines that the printing stop condition is not satisfied. In FIG. 3, the process of ACT 210 is shown as "is the stop condition satisfied?".

Here, the printing stop condition includes at least one of three conditions such as, for example, a first condition, a second condition, and a third condition, as one or more conditions described above. The first condition is that the remaining number of printing media placed in the printing medium storage unit 140 is 0. The second condition is that a remaining amount of toner is less than a predetermined first capacity. The first capacity is, for example, about 5% of a capacity of a toner container, and is not limited thereto. The third condition is that a capacity of waste toner in a waste toner container is equal to or greater than a predetermined second capacity. The second capacity is, for example, about 95% of the capacity of the waste toner container, and is not limited thereto. The printing stop condition may be configured to include other conditions instead of a part or all of the first condition, the second condition, and the third condition. The printing stop condition may be configured to include other conditions in addition to a part or all of the first condition, the second condition, and the third condition.

If the control unit 300 determines that the printing stop condition is not satisfied (ACT 210—NO), the control unit 300 transitions to ACT 190, and determines whether the printing of the image on each of the 1000 sheets of printing media started by receiving the printing start operation is completed.

On the other hand, if the control unit 300 determines that the printing stop condition is satisfied (ACT 210—YES), the control unit 300 causes the printer unit 130 to stop the printing of the image on the printing medium by the printer unit 130 (ACT 220).

Next, the control unit 300 waits until the printing stop condition is cleared (ACT 230). Here, if the control unit 300 determines that all of target conditions are cleared, the control unit 300 determines that the printing stop condition is cleared. On the other hand, if the control unit 300 determines that at least one of the target conditions is not cleared, the control unit 300 determines that the printing stop condition is not cleared. The target condition is a condition determined to be satisfied in ACT 210 of conditions in the printing stop condition. For example, if one of the target conditions is the first condition, the control unit 300 determines that the first condition is cleared if the remaining number of printing media placed in the printing medium storage unit 140 becomes 1 or more. For example, if one of the target conditions is the second condition, the control unit 300 determines that the second condition is cleared if the remaining amount of toner becomes the first capacity or more. For example, if one of the target conditions is the third condition, the control unit 300 determines that the third condition is cleared if the capacity of the waste toner in the waste toner container becomes less than the second capacity. The control unit 300 may be configured to determine whether each of the target conditions is cleared according to signals outputted from various sensors, or may be configured to determine whether each of the target conditions is cleared by other methods.

If the control unit 300 determines that the printing stop condition is cleared (ACT 230—YES), the control unit 300 determines whether the number of discharge counts is equal to or greater than the second threshold value (ACT 240). In FIG. 3, the second threshold value is indicated by TH2. Here, in the example, since the second threshold value is 240 sheets, the second threshold value is described as TH2=240 sheets.

If the control unit 300 determines that the number of discharge counts is less than the second threshold value (ACT 240—NO), the control unit 300 causes the printer unit 130 to restart the printing of the image on the printing medium (ACT 250). After the process of ACT 230 is performed, the control unit 300 transitions to ACT 190 and determines whether the printing of the image on each of the 1000 sheets of printing media started by receiving the printing start operation is completed.

On the other hand, if the control unit 300 determines that the number of discharge counts is equal to or greater than the second threshold value (ACT 240—YES), the control unit 300 transitions to ACT 150 and notifies the alert information.

As described above, if the printing stops due to the printing stop condition before the number of discharge counts is equal to or greater than the first threshold value, and if the number of discharge counts is equal to or greater than the second threshold value, the image forming apparatus 100 notifies the alert information for urging the removal of the printing media from the exit tray 160. Accordingly, the image forming apparatus 100 can prevent the printing from being repeatedly stopped in a short period of time. As a result, the image forming apparatus 100 can improve the convenience of the user.

In the image forming apparatus 100 described above, the control unit 300 counts the number of discharge counts. However, the image forming apparatus 100 may be configured to include a sensor capable of detecting the number of printing media on the exit tray 160. If the image forming apparatus 100 includes the sensor, the control unit 300 determines whether the number of printing media on the exit tray 160 is equal to or greater than the first threshold value in ACT 130 of the flowchart illustrated in FIG. 3. Next, if the number of printing media on the exit tray 160 is equal to or greater than the first threshold value, the control unit 300 causes the printer unit 130 to stop the printing of the image on the printing medium in ACT 140, and notifies the alert information on the discharge of the printing medium to the exit tray 160 in ACT 150. If the image forming apparatus 100 includes the sensor, the control unit 300 determines whether the printing stop condition is satisfied in ACT 210, and determines whether the number of printing media on the exit tray 160 is equal to or greater than the second threshold value which is smaller than the first threshold value in ACT 220. Next, if the number of printing media on the exit tray 160 is equal to or greater than the second threshold value, and if the printing stop condition is satisfied, the control unit 300 causes the printer unit 130 to stop the printing of the image on the printing medium and notifies the alert information. Accordingly, even if the image forming apparatus 100 includes the sensor, the image forming apparatus 100 can improve the convenience of the user. The sensor may be a sensor capable of detecting a height of the printing medium on the exit tray 160. Here, the first threshold value and the second threshold value are threshold values for the height of the printing medium on the exit tray 160.

If the image forming apparatus 100 described above includes the sensor capable of detecting the number of printing media on the exit tray 160, for example, the image forming apparatus 100 determines, in response to chattering, that the number of printing media on the exit tray 160 is equal to or greater than the first threshold value if the sensor is continuously turned ON for a predetermined first time. Here, the image forming apparatus 100 may be configured to determine that the number of printing media on the exit tray 160 is equal to or greater than the second threshold value if the sensor is continuously turned ON for a second time shorter than the first time. In the case of the above-described configuration, even if the control unit 300 determines that the sensor is continuously turned ON for the second time in ACT 220 of the flowchart illustrated in FIG. 3, the control unit 300 transitions to ACT 150.

As described above, the image forming apparatus (the image forming apparatus 100 in the example described above) includes: the exit tray (the exit tray 160 in the example described above); the printing unit (the printer unit 130 in the example described above); and the control unit (the control unit 300 in the example described above). The printing medium after printing is discharged to the exit tray. The printing unit performs the printing of the image on the printing medium and discharges the printing medium after printing to the exit tray. If the number of printing media on the exit tray (T in the example described above) is equal to or greater than the predetermined first threshold value (TH1 in the example described above), the control unit causes the printing unit to stop the printing of the image on the printing medium, and notifies the alert information on the discharge of the printing medium to the exit tray (the image P1 in the example described above). If the number of printing media on the exit tray is equal to or greater than the second threshold value (TH2 in the example described above) which is smaller than the first threshold value, and if the predetermined printing stop condition is satisfied, the control unit causes the printing unit to stop the printing of the image on the printing medium, and notifies the alert information. Accordingly, the image forming apparatus can improve the convenience of the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

A program for realizing a function of any component in the apparatus described above (for example, the image forming apparatus 100) may be recorded in a computer-readable recording medium, and the program may be read by a computer system and executed. The term "computer system" used herein includes an operating system (OS) and hardware such as a peripheral device or the like. The "computer-readable recording medium" refers to a portable medium such as a flexible disk, a magneto-optical disk, a ROM, a compact disk (CD)-ROM, or the like, and a storage apparatus such as a hard disk built in the computer system or the like. The "computer-readable recording medium" includes the one that stores the program for a certain period of time, such as a volatile memory (RAM) inside the computer system serving as a server and a client if the program is transmitted via a network such as the Internet or the like, and a communication line such as a telephone line or the like.

The program may be transmitted from the computer system in which the program is stored in the storage apparatus or the like to another computer system via a transmission medium or by a transmission wave in the transmission medium. Here, the "transmission medium" for transmitting the program refers to a medium having a function of transmitting information, such as a network (a communication network) such as the Internet or the like, and a communication line such as a telephone line or the like.

The program may be the one for realizing a part of the above-described function. The program may be a so-called difference file (a difference program) that can realize the above-described function in combination with the program already recorded in the computer system.

What is claimed is:
1. An image forming apparatus, comprising:
an exit tray to which a printing medium after printing is discharged;
a printing component configured to perform printing of an image on the printing medium and to discharge the printing medium after printing to the exit tray;
an output component configured to output information; and
a controller configured to
cause the printing component to stop the printing of the image on the printing medium and to cause the output component to output alert information upon discharge of the printing medium to the exit tray if a number of printing media on the exit tray is equal to or greater than a predetermined first threshold value, and cause the printing component to stop the printing of the image on the printing medium and to cause the output component to output the alert information if the number of printing media on the exit tray is equal to or greater than a second threshold value which is smaller than the first threshold value, and if a predetermined printing stop condition is satisfied.

2. The image forming apparatus according to claim 1, wherein the controller causes the printing component to stop the printing of the image on the printing medium and causes the output component to output the alert information if the number of sheets of the printing medium after printing discharged to the exit tray is counted as the number of discharge counts, and a number of discharge counts is equal to or greater than the first threshold value, and causes the printing component to stop the printing of the image on the printing medium and causes the output component to output the alert information if the number of discharge counts is equal to or greater than the second threshold value and the printing stop condition is satisfied.

3. The image forming apparatus according to claim 1, wherein the controller causes the printing component to continuously perform the printing of the image on the printing medium if a number of discharge counts is equal to or greater than the second threshold value and the printing stop condition is not satisfied.

4. The image forming apparatus according to claim 1, wherein a number of discharge counts is reset every time printing on one or a plurality of the printing media forming one job is completed.

5. The image forming apparatus according to claim 1, wherein a printing stop condition comprises at least one of three conditions including a condition in which a remaining number of printing media placed in a printing media storage unit is 0, a condition in which a remaining amount of toner is less than a predetermined third threshold value, and a condition in which a capacity of waste toner in a waste toner container is equal to or greater than a predetermined fourth threshold value.

6. The image forming apparatus according to claim 1, with the proviso that the image forming apparatus does not comprise at least one of a sensor or a switch to detect that a number of printing media discharged to the exit tray reaches a predetermined number.

7. The image forming apparatus according to claim 1, further comprising:

at least one of a sensor or a switch to detect that a number of printing media discharged to the exit tray reaches a predetermined number.

8. The image forming apparatus according to claim 1, further comprising:

a display for viewing the output information.

9. A method for controlling an image forming apparatus including an exit tray to which a printing medium after printing is discharged, a printing component configured to perform printing of an image on the printing medium and to discharge the printing medium after printing to the exit tray, and an output component configured to output information, the method comprising:

causing the printing component to stop the printing of the image on the printing medium and causing the output component to output alert information upon discharge of the printing medium to the exit tray if a number of printing media on the exit tray is equal to or greater than a predetermined first threshold value, and causing the printing component to stop the printing of the image on the printing medium and causing the output component to output the alert information if the number of printing media on the exit tray is equal to or greater than a second threshold value which is smaller than the first threshold value, and if a predetermined printing stop condition is satisfied.

10. The method according to claim 9, further comprising:

causing the printing component to stop the printing of the image on the printing medium and causing the output component to output the alert information if the number of sheets of the printing medium after printing discharged to the exit tray is counted as the number of discharge counts, and a number of discharge counts is equal to or greater than the first threshold value, and causing the printing component to stop the printing of the image on the printing medium and causes the output component to output the alert information if the number of discharge counts is equal to or greater than the second threshold value and the printing stop condition is satisfied.

11. The method according to claim 9, further comprising:

causing the printing component to continuously perform the printing of the image on the printing medium if a number of discharge counts is equal to or greater than the second threshold value and the printing stop condition is not satisfied.

12. The method according to claim 9, wherein a number of discharge counts is reset every time printing on one or a plurality of the printing media forming one job is completed.

13. An inkjet printer, comprising:

an exit tray to which a printing medium after printing is discharged;

an inkjet printing component configured to perform printing of an image on the printing medium and to discharge the printing medium after printing to the exit tray;

an output component configured to output information; and a controller configured to cause the inkjet printing component to stop the printing of the image on the printing medium and to cause the output component to output alert information upon discharge of the printing medium to the exit tray if a number of printing media on the exit tray is equal to or greater than a predetermined first threshold value, and cause the inkjet printing component to stop the printing of the image on the printing medium and to cause the output component to output the alert information if the number of printing media on the exit tray is equal to or greater than a second threshold value which is smaller than the first threshold value, and if a predetermined printing stop condition is satisfied.

14. The inkjet printer according to claim 13, wherein the controller causes the inkjet printing component to stop the printing of the image on the printing medium and causes the output component to output the alert information if the number of sheets of the printing medium after printing discharged to the exit tray is counted as the number of discharge counts, and a number of discharge counts is equal to or greater than the first threshold value, and causes the inkjet printing component to stop the printing of the image on the printing medium and causes the output component to output the alert information if the number of discharge counts is equal to or greater than the second threshold value and the printing stop condition is satisfied.

15. The inkjet printer according to claim 13, wherein the controller causes the inkjet printing component to continuously perform the printing of the image on the printing medium if a number of discharge counts is equal to or greater than the second threshold value and the printing stop condition is not satisfied.

16. The inkjet printer according to claim 13, wherein a number of discharge counts is reset every time printing on one or a plurality of the printing media forming one job is completed.

17. The inkjet printer according to claim 13, wherein a printing stop condition comprises at least one of three conditions including a condition in which a remaining number of printing media placed in a printing media storage unit is 0, a condition in which a remaining amount of toner is less than a predetermined third threshold value, and a condition in which a capacity of waste toner in a waste toner container is equal to or greater than a predetermined fourth threshold value.

18. The inkjet printer according to claim 13, with the proviso that the image forming apparatus does not comprise at least one of a sensor or a switch to detect that a number of printing media discharged to the exit tray reaches a predetermined number.

19. The inkjet printer according to claim 13, further comprising:

at least one of a sensor or a switch to detect that a number of printing media discharged to the exit tray reaches a predetermined number.

20. The inkjet printer according to claim 13, further comprising:

a display for viewing the output information.

* * * * *